No. 646,076. Patented Mar. 27, 1900.
J. F. LEWIS.
LUBRICATOR.
(Application filed Jan. 10, 1899.)
(No Model.)
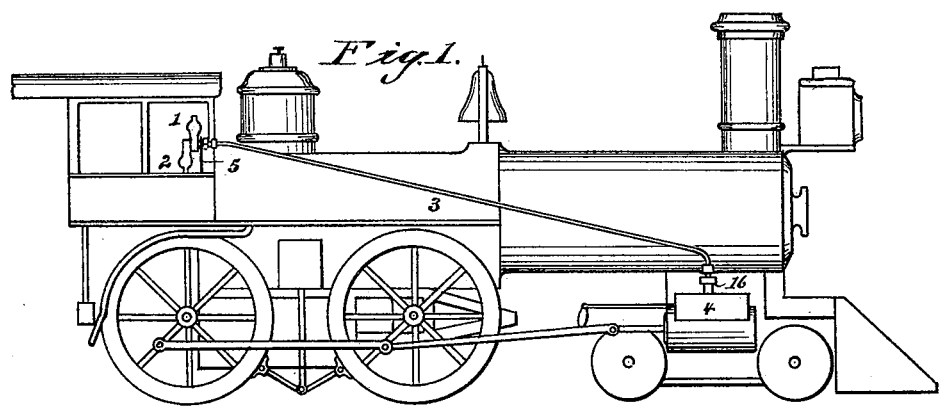
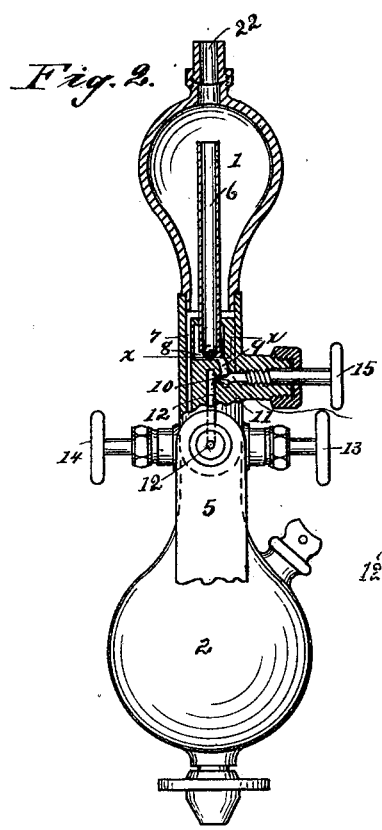
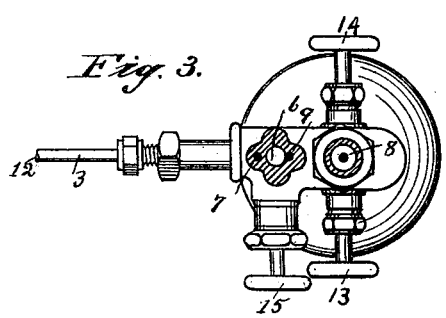
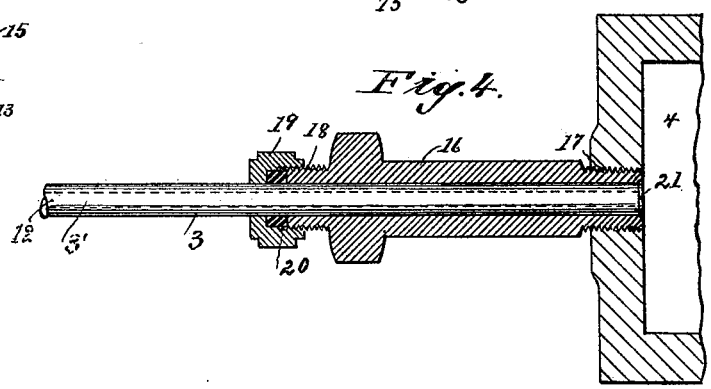
WITNESSES
R. H. Newman.
A. J. Branda.
INVENTOR
John F. Lewis
BY D. B. Replogle
ATTORNEY
THE NORRIS PETERS CO., PHOTO-LITHO., WASHINGTON, D. C.

UNITED STATES PATENT OFFICE.

JOHN F. LEWIS, OF SCRANTON, PENNSYLVANIA.

LUBRICATOR.

SPECIFICATION forming part of Letters Patent No. 646,076, dated March 27, 1900.

Application filed January 10, 1899. Serial No. 701,727. (No model.)

*To all whom it may concern:*

Be it known that I, JOHN F. LEWIS, a citizen of the United States, residing at Scranton, in the county of Lackawanna and State of Pennsylvania, have invented certain new and useful Improvements in Lubricators, of which the following is a specification.

This invention relates to displacement circulation-lubricators where the lubricant is to be conveyed a considerable distance from the lubricator to the point of application, as where the lubricator is located in the cab of a locomotive and the point of application is the steam-chest, cylinder, or other distant point.

The objects of the invention are to furnish a more certain and efficient conveyer of the lubricant and to furnish a better method of connecting up the same and other objects, as appear in this specification and are fully set forth in the claim.

To this end the invention consists of the construction and combination of parts, as are herein set forth, and illustrated in the accompanying drawings, in which—

Figure 1 is a general view of a locomotive with my device attached. Fig. 2 is a view of an ordinary lubricator, partly in cross-section, adapted to be used in operating my invention. Fig. 3 is a top view of the same lubricator, taken partly in cross-section, on the line *xx* of Fig. 2. Fig. 4 illustrates my method of connecting up the conveying-pipes and constitutes a particular feature of my present invention.

Referring to the drawings, 1 designates a condensation-chamber, and 2 an oil-reservoir suitable for use with my invention. A pipe 3, having a uniform bore throughout, connects with a union 16 at the point of application 4, and any suitable bracket 5 secures the lubricator in a fixed position. An oil-passage 3' of a certain bore leads through a union into the pipe 3, having a bore corresponding in caliber to that of the passage 3', and the pipe 3 extends through the union 16 into the steam-chest 4, and the inner end of the pipe is swaged at 21, so as to prevent it from slipping or sliding outward after it has been inserted. The union is rendered steam-tight by means of a gasket 20, compressed onto the shank 18 by means of the threaded cap 19. The union, with the pipe 3 inserted, is secured to the steam-chest by means of the threaded shank 17.

The operation of the device is as follows: A live-steam pipe is connected at 22, and condensation-water gathers in the chamber 1 and passes downward through the passage 7 into the oil-reservoir 2, buoying up the oil through the ordinary sight-feed 8, controlled by the valve 13, whence it passes into the passage 9 and there, together with a jet of live steam from the passage 6 of the tube within the chamber 1, is forced through the throat 10 into the passage 3' and thence to the point of application through the tube 3, having a continuation of the narrow passage 3'. The throat 10 is adapted to be partially closed by the nipple 11 on the end of the valve 15. The annular opening thus formed produces a vigorous spraying device, and the live steam and oil which are forced therethrough are united into a hot oily vapor. Now the particular advantage attained by my device is the conduction of this hot oily vapor to the inside of the steam chest or cylinder to be lubricated without the possibility of a precipitation of the oil. If there should be any enlargements of the bore along the way, expansion will take place in the hot oily vapor and a consequent cooling of temperature, and hence precipitation of the oil on the sides of the pipe, tending to clog the same and to rob the delivered vapor of its lubricating qualities. Where precipitation thus takes place, the oil, which should be delivered in the vapor state, gathers until the conveying-pipe is clogged of the same and is then forced into the steam-chest in larger quantities at irregular intervals, and the lubricant is thus wasted and the machinery for a greater part of the time not supplied with any. My device obviates this difficulty by driving the oily vapor to the point of destination at a highly-rapid rate before it has time to expand or cool or precipitate its oil along the way. I make the bore in the pipes leading to the point of application for an ordinary-sized locomotive the diameter of about one-eighth of an inch. In the delivery-pipes of lubricators now in use the bore is usually three-eighths to one inch in diameter, thus having a capacity of carrying from nine to sixty-four times as much as those in my device, and the throats and passage-ways of the lubricators being about the same it follows that in the small bore which I use the oily vapor must travel from nine to sixty-four times as fast, according to the size of the bore, and not being allowed to expand I have the additional advantage of maintaining the temperature and delivering with promptness by this peculiar construction and by thus recognizing the laws of heat and expansion in gases.

Having thus described my invention, what I claim as new, and desire to secure by Letters Patent, is—

The herein-described lubricating device consisting of an oil-reservoir and a condenser and means for conducting condensation-water into and oil out of said reservoir in combination with a small-bore pipe extending to a steam-chest, the entrance to said steam-chest being effected through a sleeve, the end of the pipe aforesaid being swaged and flattened so as to prevent its slipping out of said sleeve, and means for fitting the said sleeve to the said pipe for the purpose of making a secure and neat connection with the steam-chest and preserving a uniformity of the bore in the passage from the lubricator to the point of delivery, substantially as specified.

In testimony whereof I affix my signature in presence of two witnesses.

JOHN F. LEWIS.

Witnesses:
R. H. NEWMAN,
A. J. BRANDA.